March 17, 1959 F. K. CAMPBELL 2,878,390
URANIUM DETECTING DEVICES
Filed April 4, 1955 2 Sheets-Sheet 2
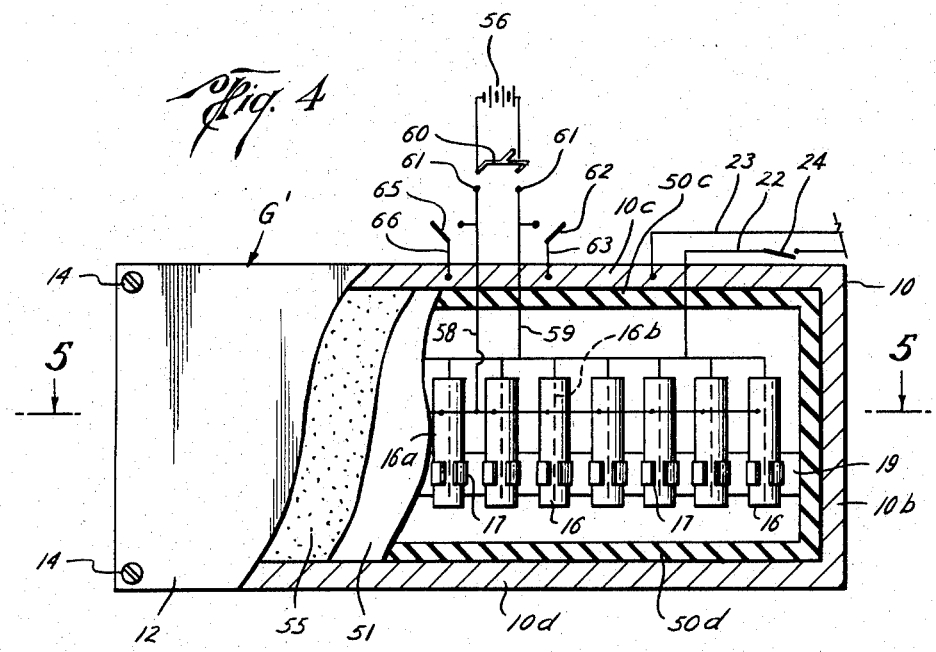
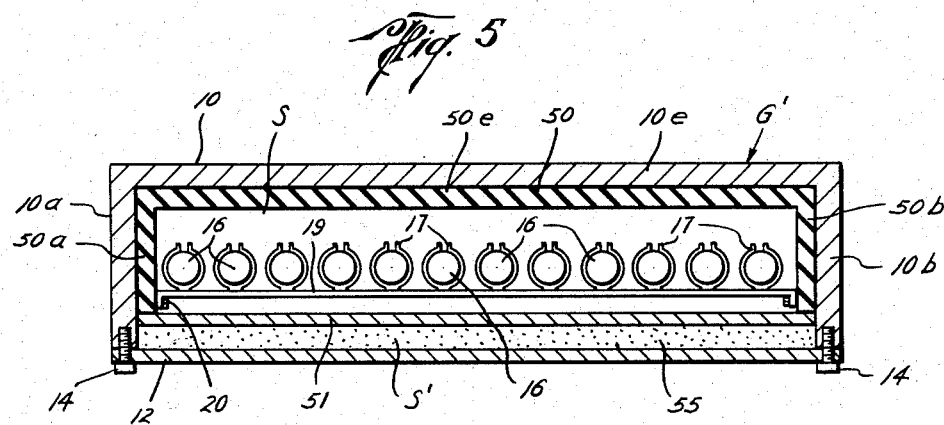
Francis K. Campbell
INVENTOR.
BY J. Vincent Martin
Joe E. Edwards
B. R. Pravel
ATTORNEYS United States Patent Office 2,878,390
Patented Mar. 17, 1959

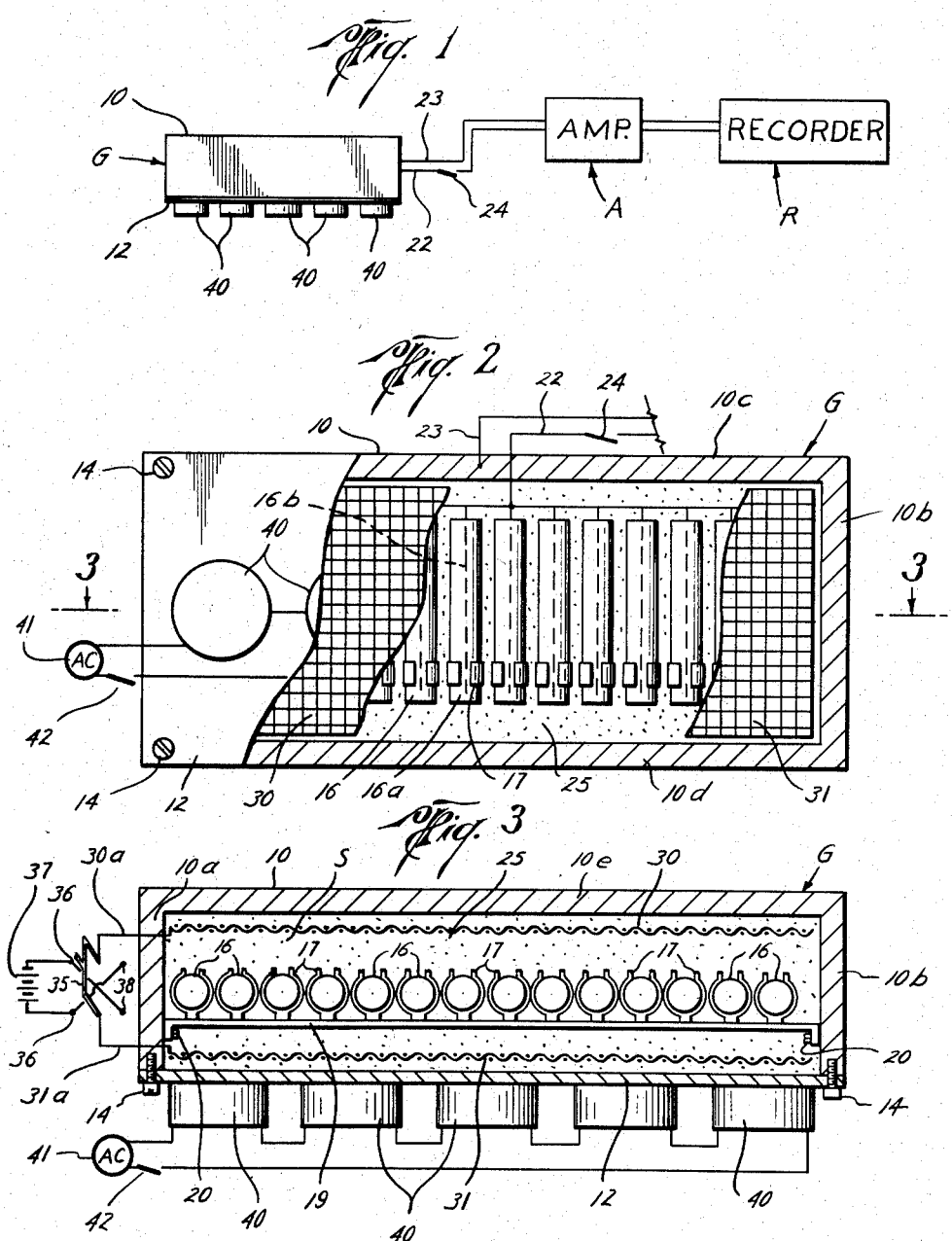

2,878,390
URANIUM DETECTING DEVICES

Francis K. Campbell, Houston, Tex., assignor, by mesne assignments, of one-half to Francis K. Campbell, Houston, Tex., and one-half to The Moran Corporation, Houston, Tex., a corporation of Delaware Application April 4, 1955, Serial No. 499,035

14 Claims. (Cl. 250—83.6)

This invention relates to new and useful improvements in uranium detecting devices.

As is known, during the disintegration or decay of uranium, many disintegration products are formed, from which alpha, beta and gamma rays, as well as radioactive gases are emitted. When the uranium is in equilibrium as an ore at its source, the alpha, beta and gamma rays are emitted, along with the radioactive gases, in equilibrium. It has been found that the relative ratio of the alpha, beta and gamma rays with respect to each other is an indication as to whether or not the uranium is in equilibrium. Reference is hereby made to my copending United States patent application, Serial No. 499,088, filed of even date herewith.

An object of this invention is, therefore, to provide a new and improved device for detecting uranium ore.

An important object of this invention is to provide a new and improved means for determining the ratio of the alpha, beta and gamma radiation of uranium ore without removing the ore from its source, whereby it can be readily determined whether or not the uranium ore is in equilibrium.

Another object of this invention is to provide a new and improved means for obtaining a separate record as to the comparative intensities of each of the alpha, beta and gamma rays emanating from a particular source such as uranium ore.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

Figure 1 is a diagrammatic view illustrating the improved device of this invention connected with a conventional amplifier and a conventional recorder.

Figure 2 is a plan view, partly in section, of the improved uranium detecting device of this invention.

Figure 3 is a vertical sectional view of the improved device of this invention taken on line 3—3 of Figure 2.

Figure 4 is a plan view, partly in section, of a modified form of the uranium detector device of this invention.

Figure 5 is a vertical sectional view taken on line 5—5 of Figure 4.

In the drawings, the letter G designates generally the new and improved detector device of this invention, which, together with the amplifier A and the recorder or indicator R, constitutes a new and improved "Geiger" type device for detecting uranium ore. As will be explained, the detector device G of this invention can be selectively manipulated so as to obtain records or indications on said recorder R which are indicative of the comparative ratio of the alpha, beta and gamma radiation of uranium ore which is detected, so that it can be determined whether or not the uranium ore is in equilibrium.

Considering now the details of the specific detector device G illustrated in Figures 1-3, such device G includes a housing or receptacle 10 which is formed of lead except for the bottom 12 which is formed of aluminum. The housing 10 may be formed in any suitable shape, but as illustrated in the drawings, such housing 10 is substantially rectangular and includes end sections 10a and 10b, sides 10c and 10d and top 10e. The bottom 12 is preferably removably attached to the housing or receptacle 10 by screws 14 or any other suitable securing means, so that when the aluminum bottom 12 is in position on the receptacle 10, a completely enclosed space S is provided which is sealed airtight at atmospheric pressure.

Within the space S, a plurality of detector tubes 16 are mounted in any suitable manner. As illustrated, the tubes 16 are each held in substantially the mid portion of the enclosed space S by a clamp 17 of resilient metal or other material which is secured to the housing or receptacle 10 by a support plate 19 which is preferably formed of an insulating material which does not conduct electricity. Thus, with the insulating plate 19 having connection with the ends 10a and 10b by means of screws 20 or any other suitable securing means, there is no electrical circuit from the detector tubes 16 to the housing or receptacle 10. The detector tubes 16 are of any standard type used in "Geiger" type devices for detecting uranium ore and each of which has a metal cylindrical exterior 16a, and an anode 16b centrally disposed within the tubes 16. Such detector tubes 16 are known as bismuth tubes, an example of which is sold under the trade name "Victoreen No. 6306." The tubes 16 are connected in parallel so that a common electrical wire 22 is connected to all of the anodes 16b of the tubes 16. A parallel wire 23 is grounded by connecting same to the housing 10. The wires 22 and 23 lead from the detector device G to the amplifier A and then to the recorder or indicator R. The recorder R is preferably of the type which indicates the electric current detected in tubes 16 in milliamperes, but any other standard type of recorder or indicator can be utilized. A switch 24 may be provided, if desired, in order to open and close the circuit to the amplifier A and the recorder or indicator R, when desired.

Surrounding the detectors 16 and substantially filling the space S but insulated from the housing 10 and the detectors 16 is a quantity of charcoal 25. The charcoal is preferably provided in a finely divided or powdered condition, and such charcoal serves to readily absorb radon gas. The radon gas contains some of the alpha and beta rays so that the intensity of the detection of those rays is amplified, as will be more fully explained hereinafter.

Within the confined space S, above the detector tubes 16, an upper screen or grid 30 is positioned which is suitably insulated from the charcoal, tubes 16, and housing 10 by an insulation covering on the wires of the screen or otherwise. A similar screen or grid 31 is likewise positioned in the charcoal 25 within the space S and below the detector tubes 16. A wire 30a is connected with the screen 30 and extends through the end 10a of the receptacle 10. A similar electrical wire 31a leads from the screen 31 through the end 10a of the receptacle 10, with the outer ends of the wires 30a and 31a having connection with a two-way throw switch 35. The switch 35 is adapted to engage contacts 36 to establish a voltage from the battery 37 across the screens 30 and 31, with the screen 31 being positive and the screen 30 being negative with the direct current source 37. When the switch 35 is thrown in the other direction for contact with the electrical contacts 38, then the polarity on the screens 30 and 31 is reversed so that the screen 30 is then positive and the screen 31 is negative. It will be appreciated, of course, that any other suitable type of switch which is capable of reversing the polarity on the screens 30 and 31 can be substituted in place of the particular switch 35 illustrated in Figure 3 of the drawings.

A plurality of coils 40 are suitably mounted on the aluminum bottom 12 and they are interconnected in series with a source of alternating current 41. Such arrangement creates an electromagnetic field around the coils 40 so that when the switch 42 is closed, such magnetic field rejects the alpha and beta rays, the purpose of which will be hereinafter explained.

In the operation or use of the detector device G illustrated in Figures 1-3, the uranium ore is initially detected by moving the detector device G along with the amplifier A and the recording or indicator R over the area being investigated. Such equipment can be carried in a truck or car or by any other suitable means so that a relatively large area can be inspected fairly rapidly. The bottom portion of the receptacle 10 which has the aluminum bottom plate 12 thereon is directed toward the area which is being investigated because the alpha, beta and gamma rays of the uranium ore do not penetrate the material of the receptacle 10, but they can pass through the aluminum 12. During the initial prospecting to locate the uranium ore, the switch 42 is open or the source of alternating current 41 is turned off so that the coils 40 are not magnetic. Therefore, part of the alpha, beta, and gamma rays penetrate through the coils 40, aluminum bottom 12 and the alpha and beta rays are absorbed by the charcoal 25 within the confined space S. The switch 36 is in a neutral position during such initial prospecting so that there is no charge in either of the screens 30 or 31. The switch 24 is, of course, closed so that any indication or detection of alpha, beta and gamma rays by the detector tubes 16 is indicated on the recorder or indicator R.

After the uranium ore has been located with the device G by reason of an indication on the indicator or recorder R, then such ore can be checked without removing the same from its source in order to determine the comparative ratio of the alpha, beta and gamma rays with respect to each other.

In order to obtain an indication of the intensity of the gamma ray radiation from the uranium ore, the alternating current source 41 is turned on and the switch 42 is closed so as to create a magnetic field around the coils 40. The switch 35 is, of course, maintained in its open position out of contact with either set of contacts 36 or 38. Since the magnetic field surrounding the coils 40 repels the alpha and beta rays, the indication on the recorder R from the detector tubes 16 is an indication of only the gamma rays. Since radium C is the source or origin of gamma rays when in equilibrium with uranium, this too would be an indication of an equilibrium condition.

Thereafter, the source of alternating current 41 is turned off, or the switch 42 is opened so that the electrical magnetic field around the coils 40 is no longer present.

In order to determine the intensity of the radiation of the alpha rays from the uranium ore, the switch 35 is moved into contact with the electrical contacts 38 so that a negative charge is produced on the screen 31 and a positive charge is produced on the screen 30. The negatively charged screen and charcoal 31 intercept the alpha rays since they are positively charged and retains them whereas the beta rays, partially, and the gamma rays pass through the screen 31 and are detected by the detector tubes 16 and recorded or indicated on the recorder R. The switch 35 is maintained in the closed position with the contacts 38 for a sufficient length of time to collect a quantity of the alpha rays thereon. Ordinarily, the time will be in the neighborhood of about five to ten minutes. Thereafter, the switch 35 is thrown into contact with the electrical contacts 36 whereby the polarity of the screens 30 and 31 is changed so that the screen 31 becomes positively charged and the screen 30 becomes negatively charged. Due to such change in polarity, the alpha rays which accumulated on the screen 31 and charcoal are discharged in the direction of the negatively charged screen 30 and as they move through the charcoal, they are detected by the detector 16 so that a reading is obtained which is indicative of the increased intensity due to the alpha rays as compared to the intensity previously obtained prior to the throwing of the switch 35 from the contacts 38 to the contacts 36 which was indicative of the entire group of the rays. Thus, the increased value or indication on the recorder R which is obtained when throwing the switch 35 from the contacts 38 to the contacts 36 is indicative of the intensity of the alpha and gamma rays' radiation from the uranium ore when normal background radiation is subtracted (cosmic and solar and mass).

Also, due to the fact that the screen 31 has become positively charged and the screen 30 has become negatively charged, the beta rays accumulate on the screen 31. After the screen 31 has been positive for a sufficient length of time to accumulate a quantity of the beta rays in proportion to the alpha rays, which again is in the order of about five to ten minutes, then the switch 35 is moved from the electrical contacts 36 back to the contacts 38. Such shifting of the switch 35 again reverses the polarity of the screens 30 and 31 so that the screen 31 again becomes negatively charged which therefore causes a rejection or movement of the beta rays which are negatively charged away from the screen 31 and towards the positively charged screen 30. As the beta rays move past the detectors 16, an indication is obtained on the recorder or indicator R which is below that amount obtained when the switch 35 is in an open position. The amount that the indicator R is below the normal indication when the switch 35 is open is an indication of the intensity of the beta and gamma rays' radiation from the uranium ore when normal background is subtracted (cosmic, solar and mass).

Thus, it will be evident that comparative indications of the alpha, beta and gamma ray radiation from a particular uranium ore can be obtained with the device G of Figures 1-3. After such comparative intensities are obtained, the comparative ratio of the alpha, beta and gamma rays can, of course, be readily calculated and such ratio indicates whether the uranium ore is present and/or is in equilibrium.

In the form of the invention shown in the Figures 4 and 5, the detector device is designated generally by the letter G', such device having the same housing or receptacle 10 with the same ends 10a and 10b, sides 10c, 10d and top 10e. The bottom opening of the receptacle 10 is closed by the aluminum bottom 12 which is held in position by screws 14 or any other equivalent securing means. The enclosed space S is thus formed in the same manner as in the form of the invention shown in Figures 1-3. Within such confined space S, the detector tubes 16 are mounted on the bar 19 by the clamps 17, with the bar 19 being held in position by screws 20 which extend through an insulation receptacle 50 and in some cases to the outer housing or receptacle 10. Such screws 20 should not, of course, establish an electrical connection from the detector tubes 16 to the lead housing 10 which is preferably avoided by forming the bar 19 of a nonconducting electrical insulating material. The insulating receptacle 50 corresponds with the interior of the lead receptacle 10 in that it has corresponding ends 50a and 50b, sides 50c and 50d, and top 50e. The detector tubes 16 and the supporting structure therefor are completely enclosed within the insulation 55 providing an insulation cover 51 which fits over the bottom portion or opening in the insulation receptacle 50. Of course, the sections of the insulation can be formed in separate pieces or can be formed integrally as desired so long as the detector tubes 16 and its supporting structure are confined therein. An area S' is preferably left between the insulation plate 51 and the aluminum plate 12, in which charcoal 55 is disposed in the usual case in order to assist in the collection of alpha and beta particles.

The detector tubes 16 are connected by electrical wires 22 and 23 to an amplifier A and a recorder or indicator R in the same manner as described above in connection with Figures 1–3. The switch 24 for opening and closing the circuit to the recorder or indicator R is preferably included.

In the device G', the screens 30 and 31 are eliminated and instead, a source of direct current 56 is connected to the outer metallic surface 16a of all of the tubes 16 in parallel by a wire 58. A second wire 59 from the direct current source 56 such as the conventional battery is connected to all of the anodes 16b of the detector tubes 16 with such anodes 16b being connected in parallel. A switch 60 is adapted to move from an open position (as indicated in Figure 4) to a closed position in electrical engagement with the electrical contacts 61 so as to apply a voltage across the tubes 16. In order to apply a positive charge to the housing or receptacle 10, a switch 62 is closed to establish an electrical connection from the wire 59 to the wire 63 which is attached to the housing or receptacle 10. If it is desired to apply a negative charge to the housing or receptacle 10, a switch 65 is closed to establish an electrical connection from the electrical wire 58 to the wire 66 which is connected to the housing or receptacle 10. The switches 62 and 65 are, of course, opened and closed alternately as will be described hereinafter.

The interior of the space S is shown without any charcoal therein, but such can be utilized if desired. Also, the plate 12 in Figure 5 is illustrated without any coils 40 such as illustrated in Figures 2 and 3, but it will be appreciated that such coils 40 with the connecting electrical system, including the alternating current source 41 and the switch 42, can be utilized in the form of the invention shown in Figures 4 and 5 where such is desired.

The operation or use of the form of the device shown in Figures 4 and 5 is similar to that described above in connection with the form of the invention shown in Figures 1–3. With the switch 24 closed so as to connect the amplifier A and the recorder or indicator R to the detector device G', and with the switch 60 in an open position so as to disconnect the battery 56 from the device G', the device G' is moved over the area being investigated in order to obtain an initial indication of the presence of uranium ore by an indication or record made on the indicator or recorder R. When such indication occurs by reason of the alpha, beta and gamma rays passing through the aluminum plate 12, charcoal 55, insulating cover 51 into the area S for detection by the detector tubes 16, then the device G' can be manipulated to selectively determine the relative proportions of the alpha, beta and gamma rays. The switches 62 and 65 are, of course, also opened during the initial detection of the uranium ore.

Thereafter, the switch 60 is closed and then the switch 65 is closed to place a negative charge on the housing or receptacle 10. The negative charge accumulates the alpha rays which are positively charged and such switch 65 is maintained closed for a sufficient length of time, usually in the neighborhood of five to ten minutes, to collect the sufficient quantity of the alpha rays to make the indication on the recorder or indicator R. Then, the switch 65 is opened and the switch 62 is closed which results in a discharge of the alpha particles from the housing or receptacle 10 toward the negatively charged outer surfaces of the tubes 16. The amount of increase of the reading on the indicator R is indicative of the intensity of the alpha rays. Such increase would, of course, be compared with the reading when both the switches 62 and 65 are open.

In order to obtain the indication of the intensity of the beta rays, the switch 62 is opened and the switch 65 is closed which causes a discharge of the beta rays since they are negative from the then negatively charged housing or receptacle 10 toward the positive charge on the anodes 16b of the tubes 16. The indicator reads below the normal reading since the beta rays are negatively charged and the amount of decrease is indicative of the intensity of the beta rays from the uranium ore; such decrease in the reading is, of course, based on the normal reading when the switches 62 and 65 are open. Since the alpha and the beta rays are then known on a comparative basis and since the reading was obtained for the entire mass of alpha, beta and gamma rays, the gamma ray intensity can be calculated, but if it is desired to obtain an indication or record of such gamma ray intensity, the electromagnetic coils 40 such as used in the form of the invention shown in Figures 2 and 3 can be utilized in the form of the invention of Figures 4 and 5. In any event, it will be evident that the intensities of the alpha, beta and gamma rays can be readily determined or calculated with the form of the invention shown in Figures 4 and 5 in a similar manner to that described above in connection with the form of the invention shown in Figures 1–3.

The foregoing disclosures and descriptions of the invention are illustrative and explanatory thereof, and various changes in the size, shape and materials, as well as in the details of the illustrated construction may be made within the scope of the appended claims without departing from the spirit of the invention.

What is claimed is:

1. A device for obtaining a separate indication as to the intensity of each of the alpha, beta and gamma rays emanating from uranium ore to determine whether such ore is present and in equilibrium, comprising an outer receptacle having an open section, said receptacle being formed of a material through which the alpha, beta and gamma rays do not pass, a cover over said open section formed of a material through which alpha, beta and gamma rays pass, a plurality of detector tubes within said receptacle electrically connected in parallel with an indicator for normally detecting the total radiation of the alpha, beta and gamma rays from uranium ore so as to obtain such an indication on said indicator, means with said device for admitting alpha and gamma rays while preventing the admission of the beta rays to said detector tubes, means for selectively varying said last-mentioned means so as to alternately admit beta and gamma rays to said detector tubes while preventing the admission of the alpha rays to said detector tubes, and means for selectively preventing the admission of both the alpha and the beta rays while admitting the gamma rays to said tubes whereby only the gamma rays are detected by said detector tubes.

2. A device for obtaining a separate indication as to the intensity of each of the alpha, beta and gamma rays emanating from uranium ore to determine whether such ore is present and in equilibrium, comprising an outer receptacle having an open section, said receptacle being formed of a material through which alpha, beta and gamma rays do not pass, a cover over said open section formed of a material through which alpha, beta and gamma rays pass, a plurality of detector tubes within said receptacle electrically connected in parallel with an indicator for normally detecting the total radiation of the alpha, beta and gamma rays from uranium ore so as to obtain such an indication on said indicator, means with said device for admitting the alpha and gamma rays while preventing the admission of the beta rays to said detector tubes, and means for selectively varying said last-mentioned means so as to alternately admit the beta and gamma rays while preventing the admission of the alpha rays to said detector tubes.

3. A device for obtaining a separate indication as to the intensity of each of the alpha, beta and gamma rays emanating from uranium ore to determine whether such ore is present and in equilibrium, comprising an outer receptacle having an open section, said receptacle being formed of a material through which alpha, beta and gamma rays do not pass, a cover over said open section formed of a material through which alpha, beta and gamma rays pass, a plurality of detector tubes within said receptacle electrically connected in parallel with an indicator for normally detecting the total radiation of the alpha, beta and gamma rays from uranium ore so as to obtain such an indication on said indicator, and means with said device for admitting the alpha and gamma rays while preventing the admission of the beta rays to said detector tubes, said last-mentioned means including an electrical conducting material, and an electrical circuit connected with said material for controlling the electrical polarity thereon for admitting the alpha and gamma rays while preventing the admission of the beta rays to said detector tubes.

4. A device for obtaining a separate indication as to the intensity of each of the alpha, beta and gamma rays emanating from uranium ore to determine whether such ore is in equilibrium, comprising an outer receptacle having an open section, said receptacle being formed of a material through which the alpha, beta and gamma rays do not pass, a cover over said open section formed of a material through which alpha, beta and gamma rays pass, a plurality of detector tubes within said receptacle electrically connected in parallel with an indicator for normally detecting the total radiation of the alpha, beta and gamma rays from uranium ore so as to obtain such an indication on said indicator, and means with said device for admitting the beta and gamma rays while preventing the admission of the alpha rays to said detector tubes, said last-mentioned means including electrical conducting material, and an electrical circuit connected with said material for controlling the electric polarity thereon for admitting the beta and gamma rays while preventing the admission of the alpha rays to said detector tubes.

5. A device for obtaining a separate indication as to the intensity of each of the alpha, beta and gamma rays emanating from uranium ore to determine whether such ore is in equilibrium, comprising an outer receptacle having an open section, said receptacle being formed of a material through which the alpha, beta and gamma rays do not pass, a cover over said open section formed of a material through which alpha, beta and gamma rays pass, a plurality of detector tubes within said receptacle electrically connected in parallel with an indicator for normally detecting the total radiation of the alpha, beta and gamma rays from uranium ore so as to obtain such an indication on said indicator, a screen positioned in said receptacle between said cover and said tubes, means for applying a negative electrical charge to said screen to attract only the alpha rays thereto, and means for selectively reversing the polarity of said charge on said screen from negative to positive to thereby attract only the beta rays thereto.

6. A device for obtaining a separate indication as to the intensity of each of the alpha, beta and gamma rays emanating from uranium ore to determine whether such ore is present and in equilibrium, comprising an outer receptacle having an open section, said receptacle being formed of a material through which the alpha, beta and gamma rays do not pass, a cover over said open section formed of a material through which alpha, beta and gamma rays pass, a plurality of detector tubes within said receptacle electrically connected in parallel with an indicator for normally detecting the total radiation of the alpha, beta and gamma rays from uranium ore so as to obtain such an indication on said indicator, a screen positioned in said receptacle between said cover and said tubes, and means for applying a negative electrical charge to said screen to attract only the alpha rays thereto.

7. A device for obtaining a separate indication as to the intensity of each of the alpha, beta and gamma rays emanating from uranium ore to determine whether such ore is in equilibrium, comprising an outer receptacle having an open section, said receptacle being formed of a material through which the alpha, beta and gamma rays do not pass, a cover over said open section formed of a material through which alpha, beta and gamma rays pass, a plurality of detector tubes within said receptacle electrically connected in parallel with an indicator for normally detecting the total radiation of the alpha, beta and gamma rays from uranium ore so as to obtain such an indication on said indicator, a screen positioned in said receptacle between said cover and said tubes, and means for applying a positive electrical charge to said screen to attract only the beta rays thereto.

8. A device for obtaining a separate indication as to the intensity of each of the alpha, beta and gamma rays emanating from uranium ore to determine whether such ore is in equilibrium, comprising an outer receptacle having an open section, said receptacle being formed of a material through which the alpha, beta and gamma rays do not pass, a cover over said open section formed of a material through which alpha, beta and gamma rays pass, a plurality of detector tubes within said receptacle electrically connected in parallel with an indicator for normally detecting the total radiation of the alpha, beta and gamma rays from uranium ore so as to obtain such an indication on said indicator, means for applying a negative electrical charge to said receptacle to attract only the alpha rays thereto, and means for selectively reversing the polarity of said charge on said receptacle from negative to positive to thereby attract only the beta rays thereto.

9. A device for obtaining a separate indication as to the intensity of each of the alpha, beta and gamma rays emanating from uranium ore to determine whether such ore is in equilibrium, comprising an outer receptacle having an open section, said receptacle being formed of a material through which the alpha, beta and gamma rays do not pass, a cover over said open section formed of a material through which alpha, beta and gamma rays pass, a plurality of detector tubes within said receptacle electrically connected in parallel with an indicator for normally detecting the total radiation of the alpha, beta and gamma rays from uranium ore so as to obtain such an indication on said indicator, and means for applying a negative electrical charge to said receptacle to attract only the alpha rays thereto.

10. A device for obtaining a separate indication as to the intensity of each of the alpha, beta and gamma rays emanating from uranium ore to determine whether such ore is in equalibrium, comprising an outer receptacle having an open section, said receptacle being formed of a material through which the alpha beta and gamma rays do not pass, a cover over said open section formed of a material through which alpha, beta and gamma rays pass, a plurality of detector tubes within said receptacle electrically connected in parallel with an indicator for normally detecting the total radiation of the alpha, beta and gamma rays from uranium ore so as to obtain such an indication on said indicator, and means for applying a positive electrical charge to said receptacle to attract only the beta rays thereto.

11. A device for obtaining a separate indication as to the intensity of each of the alpha, beta and gamma rays emanating from uranium ore to determine whether such ore is present and in equalibrium, comprising an outer receptacle having an open section, said receptacle being formed of a material through which the alpha, beta and gamma rays do not pass, a cover over said open section formed of a material through which alpha, beta and gamma rays pass, a plurality of detector tubes within said receptacle electrically connected in parallel with an indicator for normally detecting the total radiation of the alpha, beta and gamma rays from uranium ore so as to obtain such an indication on said indicator, a screen positioned in said receptacle between said cover and said tubes, means for applying a negative electrical charge to said screen to attract only the alpha rays thereto, means for selectively reversing the polarity of said charge on said screen from negative to positive to thereby attract only the beta rays thereto, and means for selectively preventing the admission of both the alpha and the beta rays while admitting the gamma rays to said tubes whereby only the gamma rays are detected by said detector tubes.

12. The structure set forth in claim 1, wherein said means for selectively preventing the admission of both the alpha and the beta rays is a magnetic field.

13. The structure set forth in claim 1, wherein said means for selectively preventing the admission of both the alpha and the beta rays includes a plurality of electrical coils on said cover, and a source of alternating current electrically connected therewith to create an electromagnetic field around said coils.

14. The structure set forth in claim 1, including finely divided charcoal disposed within said receptacle and around said tubes for absorbing the alpha and beta particles from the uranium ore to thereby increase the measurement of the alpha, beta and gamma rays from said ore.

References Cited in the file of this patent

UNITED STATES PATENTS

| | | |
|---|---|---|
| 2,508,772 | Pontecorvo | May 23, 1950 |
| 2,528,955 | Hayward | Nov. 7, 1950 |
| 2,557,158 | Teichmann | June 19, 1951 |
| 2,666,865 | Borkowski | Jan. 19, 1954 |